Patented June 24, 1947

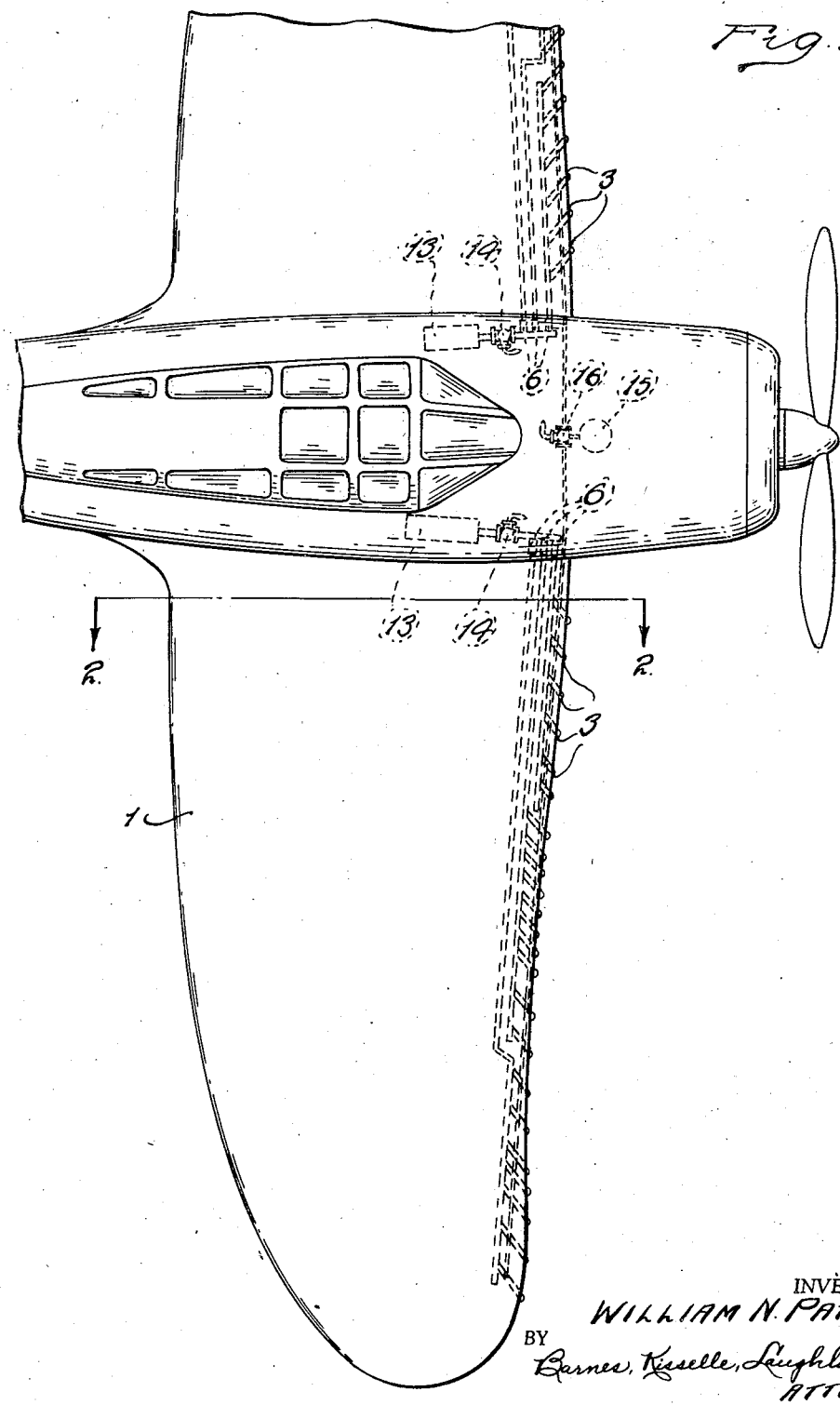

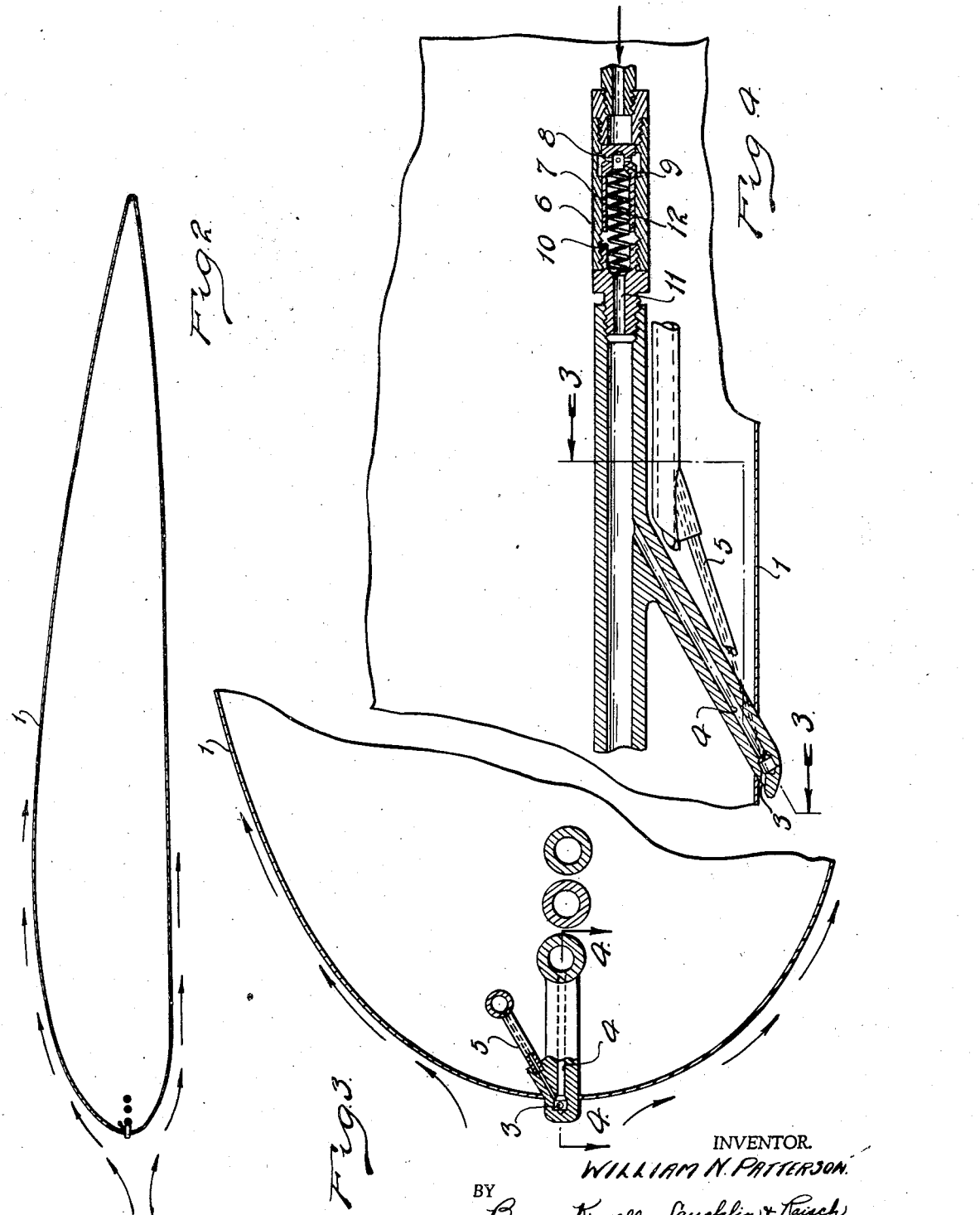

2,422,746

UNITED STATES PATENT OFFICE 2,422,746

AIRPLANE WING DEICER

William N. Patterson, Detroit, Mich., assignor to Patterson Industries Incorporated, Detroit, Mich., a corporation of Michigan Application September 13, 1941, Serial No. 410,667

6 Claims. (Cl. 244—134)

This invention relates to de-icers for airplane wings or similar purposes.

The icing of airplane wings has been a difficulty that has been experienced for a good many years and various ways have been suggested for overcoming this difficulty. So far as I am advised the problem has not been solved with complete satisfaction.

I propose to provide high pressure air and liquid jets at the forward portion of the airplane. These jets are so located that they underlie and are subcutaneous to any film of ice that forms at this location, and when the jets of air and liquid are turned on, these jets will tear off whatever accumulations of ice and snow have occurred at this point. The ice being torn off at the front of the wing will give the atmosphere through which the plane is traveling at high speed an opportunity to get in under the ice that has accumulated at the rear and this will tear the remaining ice and snow off.

Referring to the drawings:

Fig. 1 is a plan view of an airplane equipped with my improvement.

Fig. 2 is a section taken on the line 2—2 of Fig. 1.

Fig. 3 is an enlarged sectional detail of the front of the airplane wing showing my invention.

Fig. 4 is a section on the line 4—4 of Fig. 3.

1 designates the airplane wing which will ordinarily be a light metal such as aluminum. This wing forms a hollow enclosure, is streamlined or tear drop shape, as shown in Fig. 2, and in this are located the pipes that contain the fluids that are used to carry out my invention. The idea is to provide a plurality of nozzles 2. Each of these nozzles is pointed obliquely toward the outer end of the wing and has a jet opening 3 whose axis is directed substantially parallel to the surface of the wing. Air is furnished through the passageway 4 and alcohol or some other nonfreeze liquid through the passageway 5. Passageway 5 meets the passageway 4 at an acute angle so as to provide an aspirating action for the alcohol or other liquid in the passageway 5.

In order to insure substantially equal distribution of the air pressure to the entire length of the wing, I preferably divide the wing into sections and each section is served by a separate air pipe. It will be seen that there are three air pipes shown in the drawings, but, of course, the number of pipes and sections could be altered to suit conditions.

In each pipe is located a valve 6, the details of which are shown in Fig. 4. This valve is a vibrator and comprises a piston 7. As the air under considerable pressure, approximately from one hundred to one hundred fifty pounds per square inch, enters the valve, piston 7 is driven to the left. The air passes around the piston head through the orifices 8 into the center opening 9 of the piston, thence through the spring chamber 10 and the passageway 11 into the air pipe. The air accumulating behind the valve, together with spring 12, is now sufficient to again throw the piston to the right; thereupon, the air pressure at the left or on the inside of the piston drops and again the pressure accumulating on the right-hand side of the piston is strong enough to force the piston to the left so the piston, when subjected to the air stream, vibrates back and forth giving the air pipe chugs or repeated blasts of air so that the blast issuing from the nozzle protruding through the front of the wing is a series of separated blasts of high velocity air which I find more efficacious in dislodging ice and other accumulations on the front of the wing. However, the vibrating valve may be omitted and a continuous stream of air and liquid used.

I do not want to limit myself to the use of air and liquid as it is possible to get measurably good results with the air or a gaseous medium alone, but I find that the liquid makes the removal of the ice much quicker and better. Liquid, when thrown at a very high velocity, has many of the properties of a solid and has great penetrating ability. It acts much like a sand blast in its scouring action.

I have shown the air furnished from air tanks 13 with control valve 14 and the alcohol from tank 15 with control valve 16. This is only a diagrammatic showing as obviously it will be necessary to have some form of air pump and accumulator tank to provide the air under pressure.

The jets are preferably arranged to direct a stream of air and liquid, or in some cases air alone, along the lead edge of the wing toward the tip. Each jet is spaced to control effectively the distance to the next jet and each acts toward the tip. In order that sufficient air will be available and in order that balance will be maintained, the jets are preferably divided into three banks along each wing. The corresponding banks on each wing are operated together from the tip inward. The valves 14, shown diagrammatically, are arranged to direct air to the respective banks of jets in order thus insuring adequate air supply for each bank.

What I claim is:

1. In de-icing apparatus for use in connection with airplanes and similar vehicles, the combination with an airplane wing, of a plurality of nozzles having jet openings having their axes directed along the surface of the front of the wing, means for supplying a high pressure gaseous medium through the said openings and means for supplying a non-freezing liquid through said jet openings to aid the fluid jet to tear the ice from the wing.

2. In de-icing apparatus for use in connection with airplanes and similar vehicles, the combination with an airplane wing, of a plurality of nozzles having jet openings directed along the surface of the front of the wing, means for supplying air under high pressure to said jet openings and means arranged in said nozzles for aspirating into the air stream a non-freezing liquid to aid the fluid jet to tear the ice from the wing.

3. In de-icing apparatus for use in connection with airplanes and similar vehicles, the combination with an airplane wing, of a plurality of nozzles having jet openings having their axes directed along the surface of the front of the wing, means for supplying gaseous fluid at high pressure through the jet openings and a vibrator valve in the stream of gas fed to the nozzles by said means for delivering the gaseous medium in separated blasts to the jet openings.

4. In de-icing apparatus for use in connection with airplanes and similar vehicles, the combination with an airplane wing, of a plurality of nozzles having jet openings having their axes directed along the surface of the front of the wing, means for supplying air under high pressure to said jet openings, means arranged in said nozzles for injecting into the air stream a non-freezing liquid and a vibrator valve in the stream of air fed to the nozzles by said means for delivering the gaseous medium in separated blasts to the jet openings.

5. In de-icing apparatus for use in connection with airplanes and similar vehicles, the combination with an airplane wing, of a plurality of nozzles having jet openings having their axes directed along the surface of the front of the wing, means for supplying gaseous fluid at high pressure through the jet openings, a vibrator valve in the stream of gas fed to the nozzles by said means for delivering the gaseous medium in separated blasts to the jet openings, said vibrator valve comprising a spring-pressed piston located in the air pipe, which piston is vibrated back and forth by the pressure accumulating first on the side of the source of pressure, then by the pressure accumulating on the other side where, with the help of the spring, the valve closes.

6. In de-icing apparatus for use in connecction with airplanes and similar vehicles, the combination of a plurality of fluid pipes, each pipe having a plurality of nozzles which protrude through one section of the forward portion of the airplane wing so that different pipes serve different sections to the wing to evenly distribute the pressure, each nozzle provided with a jet opening for delivering high pressure fluid jets along the front surface of the wing, means for furnishing air under high pressure to each of said pipes and sets of nozzles and means for introducing a non-freezing liquid into the air stream to build up the hitting power of the jet.

WILLIAM N. PATTERSON.

REFERENCES CITED

The following references are of record in the file of this patent:

UNITED STATES PATENTS

| Number | Name | Date |
|---|---|---|
| 1,879,717 | Sikorsky | Sept. 27, 1932 |
| 1,720,140 | O'Connor | July 9, 1929 |
| 2,217,979 | Booharin | Oct. 15, 1940 |
| 1,775,757 | Gay | Sept. 16, 1930 |

FOREIGN PATENTS

| Number | Country | Date |
|---|---|---|
| 505,094 | Great Britain | May 3, 1939 |
| 29,364 | Great Britain | 1911 |